(12) United States Patent
McFarland et al.

(10) Patent No.: US 8,006,398 B2
(45) Date of Patent: Aug. 30, 2011

(54) METHOD FOR SCANNING THE SURFACE OF A WORKPIECE

(75) Inventors: Geoffrey McFarland, Wotton-under-Edge (GB); Kenneth Cheng Hoe Nai, Bristol (GB); Nicholas John Weston, Peebles (GB); Ian William McLean, Edinburgh (GB)

(73) Assignee: Renishaw PLC, Wotton-under-Edge (GB)

( * ) Notice: Subject to any disclaimer, the term of this patent is extended or adjusted under 35 U.S.C. 154(b) by 63 days.

(21) Appl. No.: 11/919,066

(22) PCT Filed: Apr. 10, 2006

(86) PCT No.: PCT/GB2006/001298
§ 371 (c)(1),
(2), (4) Date: Oct. 23, 2007

(87) PCT Pub. No.: WO2006/114567
PCT Pub. Date: Nov. 2, 2006

(65) Prior Publication Data
US 2009/0025463 A1 Jan. 29, 2009

(30) Foreign Application Priority Data
Apr. 26, 2005 (GB) .................................. 0508395.1

(51) Int. Cl.
*G01B 5/004* (2006.01)
*G01N 19/02* (2006.01)
(52) U.S. Cl. .......................................... 33/503; 73/104
(58) Field of Classification Search ..................... 33/503; 73/104
See application file for complete search history.

(56) References Cited

U.S. PATENT DOCUMENTS

| | | | |
|---|---|---|---|
| 4,888,877 A | 12/1989 | Enderle et al. | |
| 4,987,356 A | 1/1991 | Yamada et al. | |
| 5,140,239 A | 8/1992 | Matsuura | |
| 5,315,259 A | 5/1994 | Jostlein | |
| 5,334,918 A | 8/1994 | McMurtry et al. | |
| 5,471,406 A | 11/1995 | Breyer et al. | |
| 5,737,344 A | 4/1998 | Belser et al. | |
| 5,966,681 A * | 10/1999 | Bernhardt et al. | 702/152 |
| 6,154,713 A | 11/2000 | Peter et al. | |
| 6,633,051 B1 | 10/2003 | Holloway et al. | |
| 2006/0284083 A1* | 12/2006 | Kurenuma et al. | 250/309 |

FOREIGN PATENT DOCUMENTS

| | | |
|---|---|---|
| EP | 0 364 057 A2 | 4/1990 |
| EP | 0 436 735 A1 | 7/1991 |
| EP | 0 740 982 A2 | 11/1996 |
| EP | 1 505 362 A1 | 2/2005 |
| WO | WO 90/07097 A1 | 6/1990 |
| WO | WO 9007097 A1 * | 6/1990 |
| WO | WO 96/31752 A1 | 10/1996 |
| WO | WO 2004/005849 | 1/2004 |

* cited by examiner

*Primary Examiner* — Hezron Williams
*Assistant Examiner* — Nathaniel Kolb
(74) *Attorney, Agent, or Firm* — Oliff & Berridge, PLC (57) ABSTRACT

A measurement system has a surface sensing device mounted on an articulating probe head, which in turn is mounted on a coordinate positioning apparatus. The surface sensing device is moved relative to a surface by driving at least one of the coordinate positioning apparatus and probe head in at least one axis to scan the surface. The surface sensing device measures its distance from the surface and the probe head is driven to rotate the surface sensing device about at least one axis in order to control the relative position of the surface sensing device from the surface to within a predetermined range in real time.

24 Claims, 10 Drawing Sheets

METHOD FOR SCANNING THE SURFACE OF A WORKPIECE

The present invention relates to a method of scanning the surface of a workpiece using a motorized scanning head mounted on a coordinate positioning apparatus such as a coordinate measuring machine (CMM), machine tool, manual coordinate measuring arm and inspection robot.

It is known from International Patent Application No. WO90/07097 to mount a motorized scanning head on a coordinate positioning machine. The motorized scanning head enables a stylus mounted on the motorized scanning head to be rotated about two orthogonal axes. Thus the stylus may be positioned angularly about these two axes whilst the motorized scanning head can be positioned by the coordinate positioning machine in any position within the working volume of the machine.

Such a motorized scanning head provides a coordinate positioning machine with greater scanning flexibility because the motorized scanning head can position the stylus in many different orientations.

International patent application number WO 90/07097 further discloses that the rotary axes of the motorized scanning head may be operated in either positioning mode or biasing mode. The biasing mode enables surfaces to be scanned with a constant torque applied by the motors of the motorized scanning head. This patent application also discloses that a strain gauge array may be provided on the stylus to detect the forces acting on the stylus. Data from the strain gauges is used to adjust the torque applied by the motorized scanning head to keep the forces acting on the stylus as constant as possible.

In order to achieve high speed scanning with accuracy, it is desirable to minimize moving mass, and therefore dynamic errors, in the metrology system. A motorized scanning head allows high accelerations about its rotary axes and is thus suitable for use in high speed scanning.

During the scan the tip of the stylus must be kept in contact with the surface of the part being scanned. For known part scanning, the CMM and motorized scanning head can follow a prescribed path. However, for an unknown part, the path of the stylus tip needs to be adjusted to keep it on the surface of the part but without exceeding a force which could damage the stylus of the probe or cause collision with the part.

Although the motors of the motorized scanning head may apply a constant torque, factors such as acceleration, gravity and surface friction influence the force felt at the stylus tip. Furthermore, the force felt at the stylus tip will vary with the angle of the stylus relative to the surface. Thus constant torque does not necessarily result in constant stylus tip force. The method of using constant torque is thus not suitable for high speed scanning because it does not ensure constant force at the stylus tip.

High contact forces between the stylus tip and surface are required to ensure the probe stays in contact with the surface. High speed scanning with high forces is undesirable as it causes wear on the sensor. Thus it is desirable to minimize force. However, to measure low force with force sensors such as strain gauges, the force sensors must be mounted on a flexible structure. Such a flexible structure is not robust and is liable to break if dropped or due to collision, therefore this is a major obstacle to carrying out high speed scanning with constant force. Hence, there is a problem in sensing the small forces required for high speed scanning with constant force at the probe tip.

High bandwidth force measuring probes which are required for high speed scanning generally have a short range. Therefore, any significant deviations in the part from its expected form (for example due to machining errors or fixturing etc) could result in the probe going out of range.

A first aspect of the present invention provides a measuring system in which a surface sensing device is mounted on a probe head, the probe head being mounted on a coordinate positioning apparatus;

wherein the coordinate positioning apparatus may be operated to produce relative movement between the probe head and a surface profile and wherein the probe head includes one or more drives for producing rotational movement of the surface sensing device about one or more axes;

wherein the surface sensing device is moved relative to the surface by driving at least one of the coordinate positioning apparatus and probe head in at least one axis to scan the surface;

wherein the surface sensing device measures its distance from the surface; and wherein the probe head is driven to rotate the surface sensing device about at least one axis in order to control the relative position of the surface sensing device from the surface to within a predetermined range in real time.

This has the advantage that the surface sensing device can be calibrated over a pre-defined range to maximize accuracy. Thus a better calibration fit can be achieved by calibrating the surface sensing device over this predetermined range than over the whole range of said device.

The surface sensing device may comprise a contact probe with a deflectable stylus, in this case the deflection is kept within a predetermined range.

The surface sensing device may comprise a non contact probe, such as a capacitance, inductance or optical probe. In this case, the offset is kept with a predetermined range.

The relative position of the surface sensing device from the surface may be kept in the predetermined range by moving the surface sensing device along a deflection or offset vector. (The movement may either be in the same or opposite direction as the vector.) For a two or three dimensional probe, the deflection or offset vector is established from the output of the surface sensing device. For a one dimensional probe, the deflection vector is equal to the surface normal which may be assumed from nominal data or predicted using historical data.

The movement of the surface sensing device relative to the surface by driving at least one of the coordinate positioning apparatus and probe head in at least one axis can be produced by moving along a drive vector which may be determined from the deflection or offset vector. The drive vector may be determined by rotating the deflection vector by approximately 90°.

Feedback from the surface sensing device may be used to drive the probe head to adjust the distance of the surface sensing device in real time.

A second aspect of the present invention provides an articulating probe head on which a surface sensing device may be mounted, the articulating probe head providing rotational movement of the surface sensing device about at least one axis;

wherein the probe head is provided with at least one rotary measurement device to measure the angular position of the surface sensing device about said at least one axis; and wherein said at least one rotary measurement device is error mapped.

Preferably the at least one rotary measurement device is error mapped separately from other errors in the articulating probe head.

The at least one rotary measurement device may have a look up table, error function or Fourier series relating the measured angular position of the surface sensing device to the error.

The at least one rotary measurement device may have a look up table, error function or Fourier series relating the measured angular position of the surface sensing device to the corrected angular position of the surface sensing device.

Examples of preferred embodiments of the invention will now be described with reference to the accompanying drawings wherein.

Figure 1:
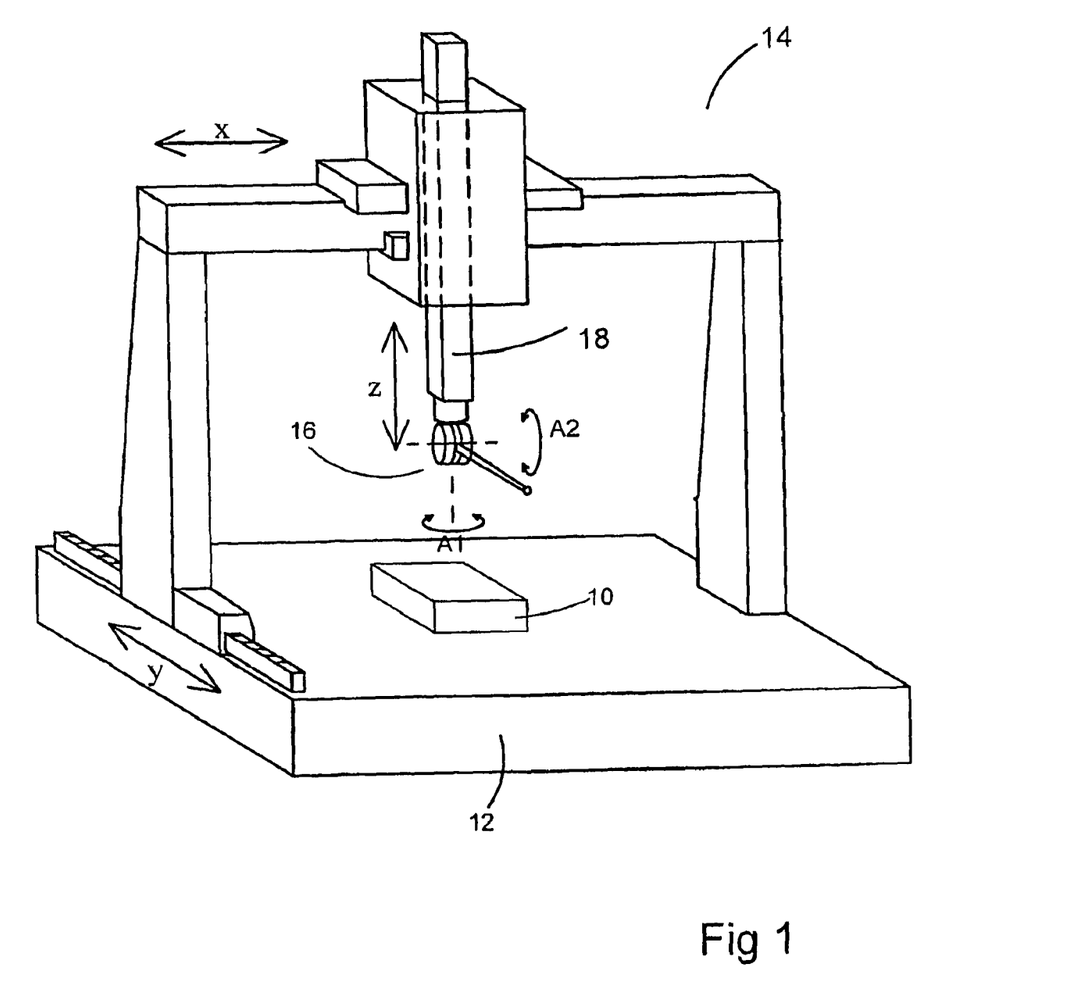
FIG. 1 is an elevation of a coordinate measuring machine including scanning apparatus according to the present invention.

FIG. 1 illustrates a motorized scanning head mounted on a coordinate measuring machine (CMM). A workpiece 10 to be measured is mounted on a table 12 of the CMM 14 and a motorized scanning head 16 is mounted on a quill 18 of the CMM 14. The spindle is driveable in the directions X,Y,Z relative to the table by motors in a known manner.

Figure 2:
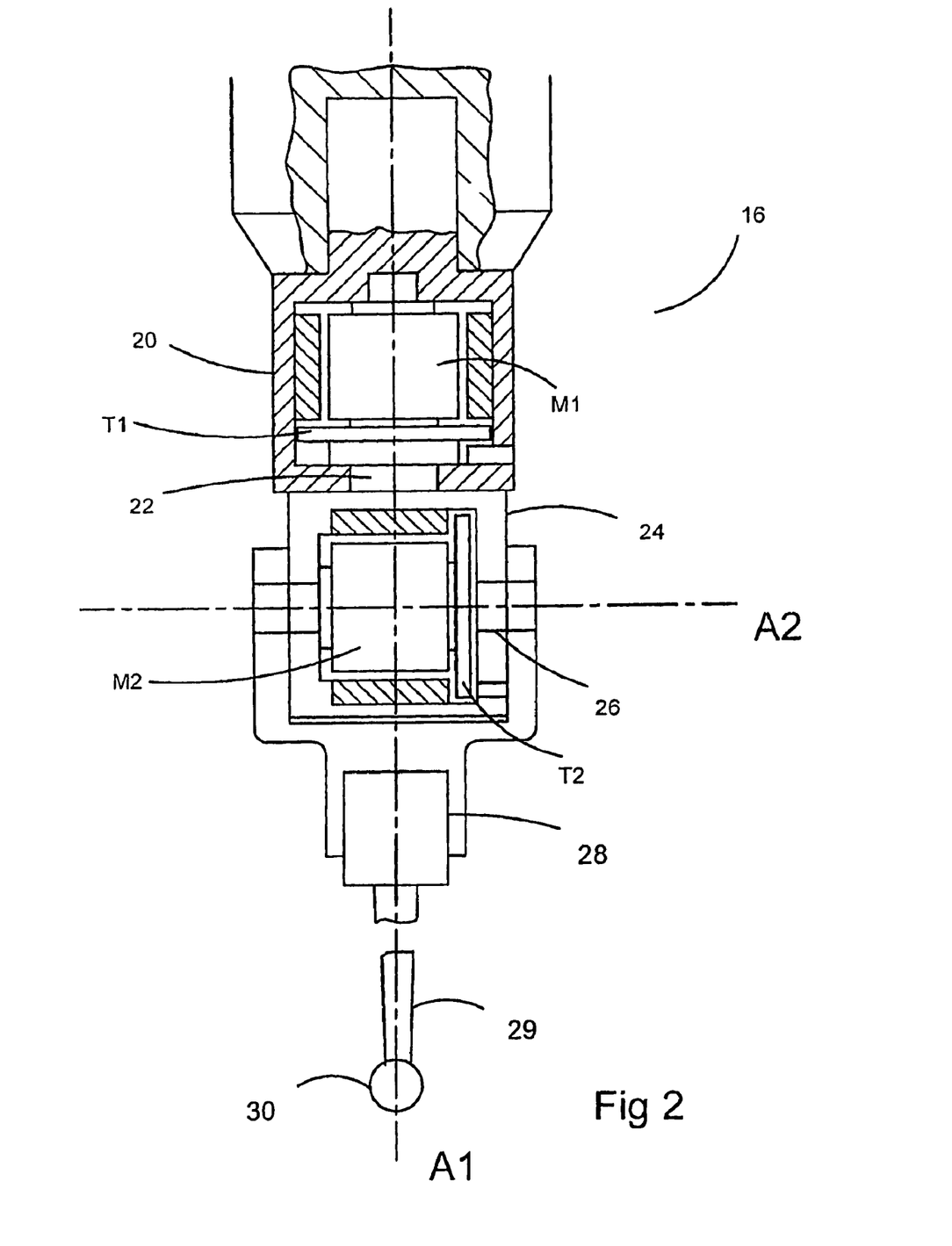
FIG. 2 is a cross-section of a motorized scanning head.

As illustrated in FIG. 2, the motorized scanning head 16 comprises a fixed part formed by a base or housing 20 supporting a movable part in the form of a shaft 22 rotatable by a motor M1 relative to the housing 20 about an axis A1. The shaft 22 is secured to a further housing 24 which in turn supports a shaft 26 rotatable by a motor M2 relative to the housing 24 about an axis A2 perpendicular to the axis A1.

A probe 28 with a stylus 29 having a workpiece contacting tip 30 is mounted onto the motorized scanning head. The arrangement is such that the motors M1, M2 of the head can position the workpiece-contacting tip angularly about the axes A1 or A2 and the motors of the CMM can position the motorized scanning head linearly anywhere within the three-dimensional coordinate framework of the CMM to bring the stylus tip into a predetermined relationship with the surface being scanned. The motors M1, M2 are direct drive, which enables the motors to act quickly in response to demands from the controller.

Low friction bearings, such as air bearings (which have zero friction), also enable responsive high speed movement of the probe abut the A1 and A2 axes. Air bearings have the further advantage that they are light.

Linear position transducers are provided on the CMM for measuring linear displacement of the scanning head and angular position transducers T1 and T2 are provided in the scanning head for measuring angular displacement of the stylus about the respective axes A1 and A2. The transducers T1 and T2 are closely coupled to the load (i.e. the probe). This provides accurate position data of the probe. The bearings in the scanning head are stiff which ensures that the transducers T1 and T2 can give accurate position data relative to earth.

The probe has a deflectable stylus 29 and transducers in the probe measure the amount of stylus deflection. Alternatively a non contact probe may be used. The probe may be one dimensional (e.g. a non-contact probe which senses distance from surface), two dimensional (e.g. a contact probe sensing deflection in X and Y) or three dimensional (e.g. a contact probe sensing deflection in X, Y and Z).

On a vertical arm CMM as shown in FIG. 1, the A1 axis of the scanning head 16 is nominally parallel to the CMM Z axis (which is along the spindle 18). The scanning head may rotate the probe continuously about this axis. The A2 axis of the scanning head is orthogonal to its A1 axis.

The motorized scanning head has a low inertia structure which makes it suitable for high speed scanning. The low inertia structure is achieved by its small and light structure. The scanning head also has a stiff structure and bearings which reduces measurement error.

Figure 3:
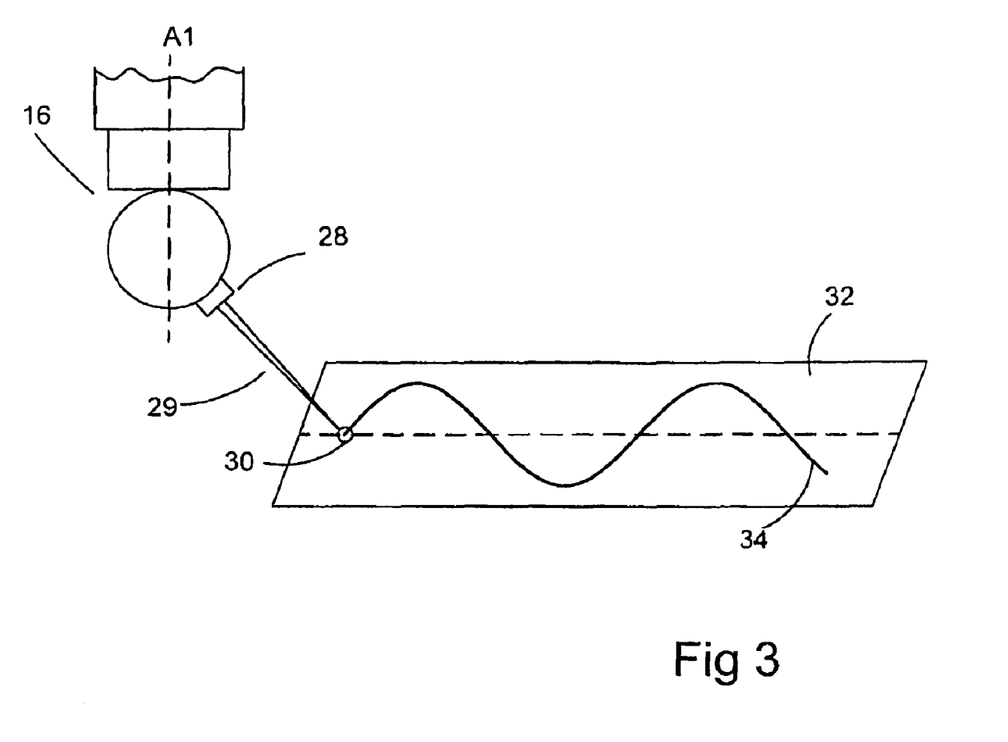
FIG. 3 illustrates a sweep scan of a plane surface.

A first embodiment of the invention is illustrated in FIG. 3 in which a plane surface 32 is scanned using a sweep scan profile 34.

The CMM moves the head along a path, whilst the motorized scanning head oscillates the probe about one rotary axis in a direction transverse to the path of the CMM, creating a sinusoidal profile.

The deflection of the stylus 29 is measured by transducers in the probe. The deflection is kept as close as possible to a target value, within a desired range. The output from the probe 28 is sent to a controller. If the deflection moves away from the target value, the angle of the probe 28 about the other rotary axis of the motorized scanning head is adjusted to adjust the deflection and keep it close to the target value.

Figure 4:
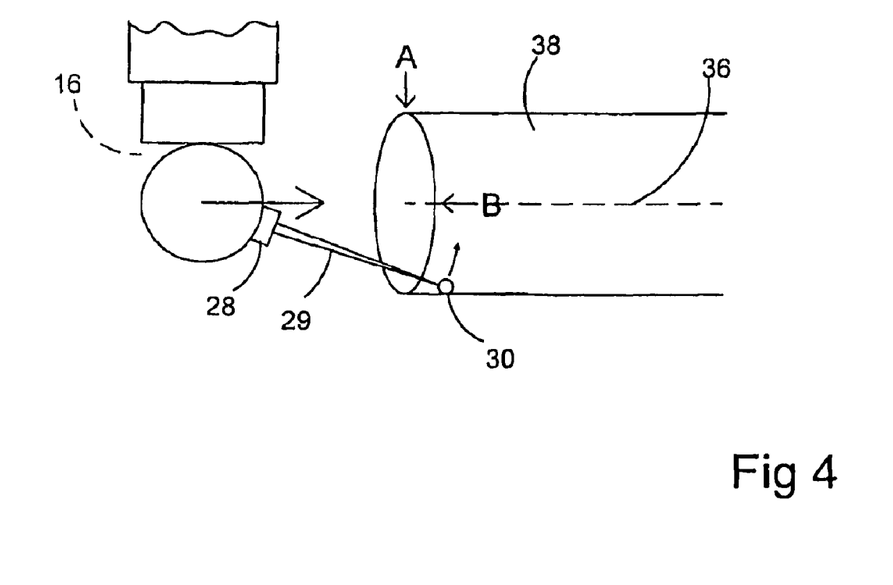
FIG. 4 illustrates a scan of a bore.

FIG. 4 illustrates a method of scanning a bore or circular profile with the system. In this case, the motorized scanning head 16 is moved along the centre line 36 of the bore 38. The rotary axes A1, A2 of the motorized scanning head 16 are used to move the stylus tip 30 around the inner circumference of the bore, so that the combined motion of the CMM and motorized scanning head cause the stylus tip to move in a spiral path about the inner surface of the bore.

At position A, one rotary axis is driving the probe and the other rotary axis is used to adjust the stylus deflection. At position B it is the other way around. In between the A and B positions, the two rotary axes act in combination to drive the probe along the spiral profile and to adjust deflection.

Other surface profiles may be measured using this technique, in which either one or both rotary axes is used to adjust deflection of the probe and the other or both of the rotary axes is used in driving the probe.

Figure 5:
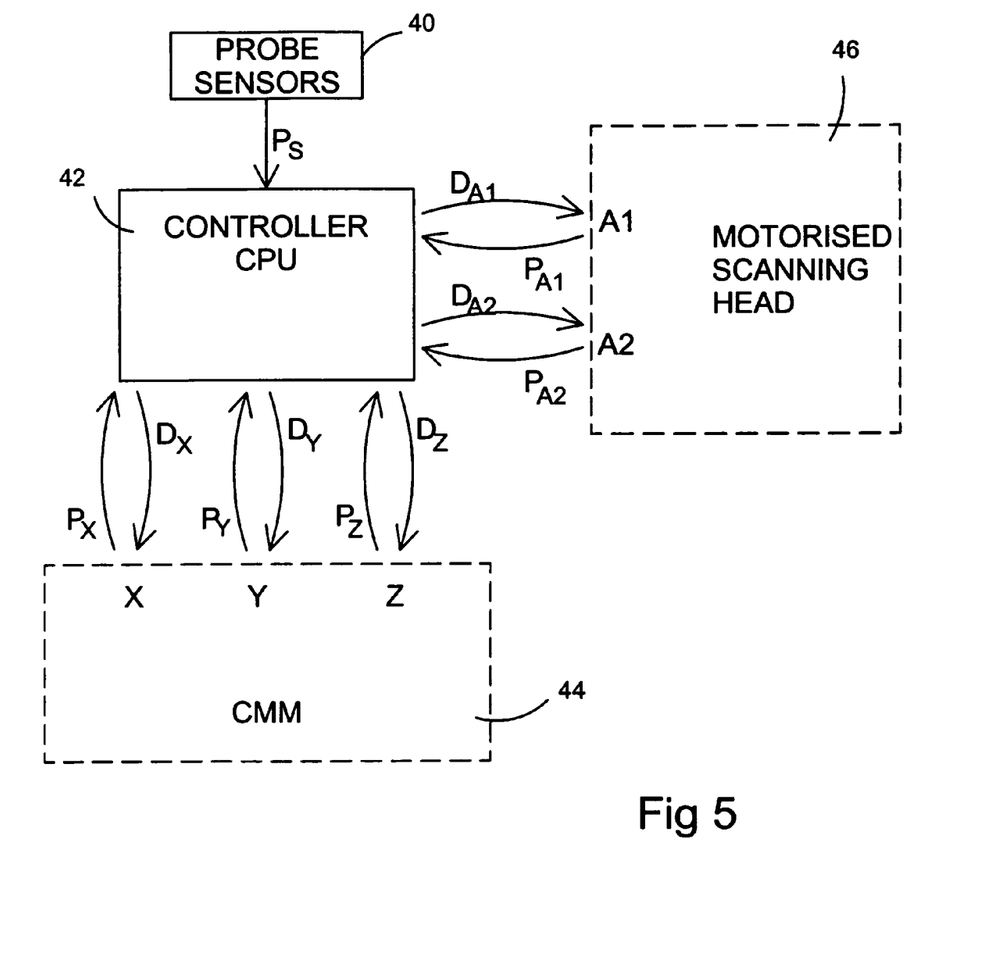
FIG. 5 is a flow diagram illustrating the feedback system.

FIG. 5 is a flow diagram illustrating the feedback for control of stylus deflection. The output $P_S$ from the probe sensors 40 is sent to a central processing unit (CPU) 42. The output may contain data in one, two or three dimensions.

The CPU 40 also receives positional inputs $P_X$, $P_Y$, $P_Z$, $P_{A1}$, $P_{A2}$ from the encoders of the X, Y and Z axes of the CMM 44 and of the encoders of the A1 and A2 axes of the motorized scanning head 46. The CPU 42 is able to calculate the surface position from the CMM data $P_X$, $P_Y$, $P_Z$, motorized scanning head data $P_{A1}$, $P_{A2}$ and probe sensor data $P_S$.

The CPU can also compare the measured stylus deflection to the target value and the prescribed limits.

Figure 6:
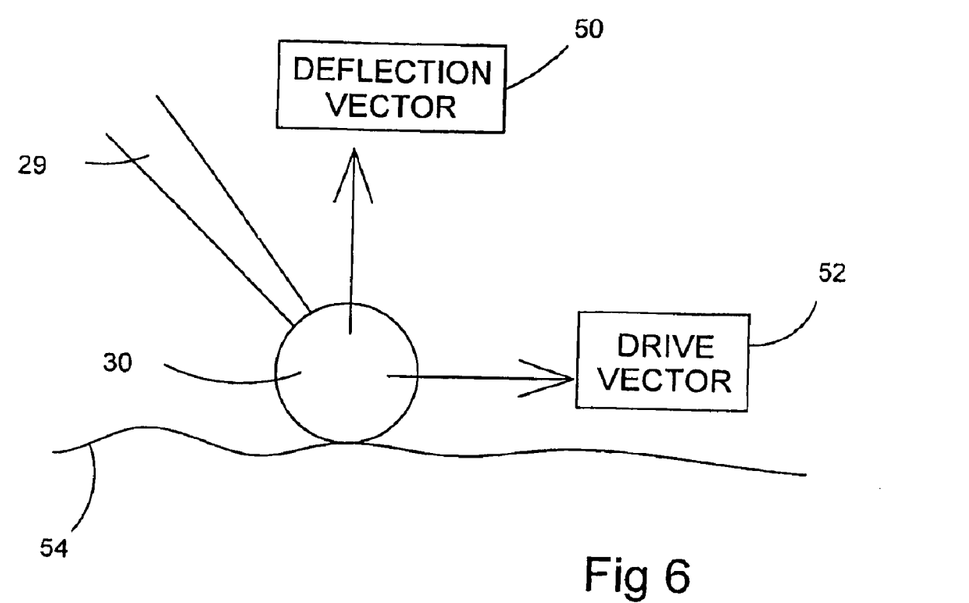
FIG. 6 illustrates a stylus tip on a surface with its associated deflection and drive vectors.

If the probe sensor is a 2D or 3D sensor, then the CPU can calculate the deflection vector 50 of the stylus tip, which is illustrated in FIG. 6. This is the direction in which the stylus tip 30 is deflected. This is also the direction parallel to which the position of the stylus tip should be adjusted to keep the deflection within the prescribed limits and as close to the target value as possible.

The deflection vector may also be used to generate the drive vector 52, which is the direction in which the stylus tip 30 is driven along the surface 54. In order to generate the drive vector, the deflection vector is rotated by approximately 90°. The general direction is already known (e.g. from the CAD data, part program, or from historical data points) but this calculation keeps the drive vector at a tangent to the surface.

Once the CPU has determined the drive vector and the deflection vector, it can send drive commands $D_X$, $D_Y$, $D_Z$, $D_{A1}$, $D_{A2}$ to the CMM and motorized scanning head. Drive commands are sent to the X,Y,Z axes and one or both of the motorized scanning head axes to drive the stylus tip along the drive vector. These commands are sent by voltage or currents to the respective motors.

Deflection adjustment commands are sent to one or both of the motorized scanning head rotary axes in the form of a voltage or current to control the deflection in a direction parallel to the deflection vector.

Both deflection and drive are thus adjusted in real time using feedback from the probe.

The CPU generates synchronized drive commands to the motorized scanning head and the CMM. This ensures that the rotary motion provided by the scanning head does not get ahead of or lag behind the linear motion of the CMM. This synchronization has the advantage that for scanning surfaces, for example, free form surfaces, both the scanning head and CMM can provide motion about their respective axes in response to the drive vector (e.g. to avoid unexpected obstacles).

In order for real time deflection control to be achieved, it is important that the probe sensors are able to produce fast and accurate measurements of the probe deflection. A fast and accurate method of measuring probe deflection is by optical means.

European patent application EP 1,505,362 discloses optical transducers for sensing deflection of a stylus holder into which a stylus is mounted. Each transducer includes a laser diode light source which projects a beam upon an optical feature, such as a mirror, located on the stylus holder. Light reflected off the optical feature is incident upon a position sensitive detector, the output of which is indicative of the incident position of the reflected light, and therefore of the displacement of the stylus holder.

United States patent number U.S. Pat. No. 6,633,051 discloses a stylus assembly having a relatively stiff hollow stylus carrier and a relatively flexible hollow stylus. An optical transducer system is provided within the stylus assembly and comprises a fixed light source which directs a beam of light towards a stylus tip and a retro reflective component at the tip which reflects the beam back to a fixed detector. The arrangement is such that lateral displacement of the stylus tip when the tip is in contact with a surface can be measured directly. This arrangement has the advantage that the position of the stylus tip is sensed, thus stylus bending is taken into account.

Both of these arrangements have the advantage that they are light, responsive and have high resolution and the disclosures are incorporated by reference into the present application.

In order for the probe to be suitable for high speed scanning, it needs to have high structural resonance, i.e. it must be sufficiently stiff in order to follow the measurement path at a high speed. However, a stiff probe has the disadvantage that it has a narrow range. Thus feedback is required to keep the probe within its measurement range.

This invention is also suitable with a non contact probe, such as a capacitance, inductance or optical probe. In this case, it is the offset of the probe which is kept within prescribed limits, as close to an offset target as possible. Outside the prescribed limits, the probe may not behave linearly or may not be calibrated.

The non-contact probe may have a scalar sensor, in this case, the sensor output will give the distance from the surface but it will not give any information about the direction. Thus on the sensor output alone, there is not sufficient data to determine in which direction the probe needs to be moved in order to adjust the offset. Additionally, as the deflection vector cannot be determined from the sensor data, the drive vector also cannot be determined.

Figure 7:
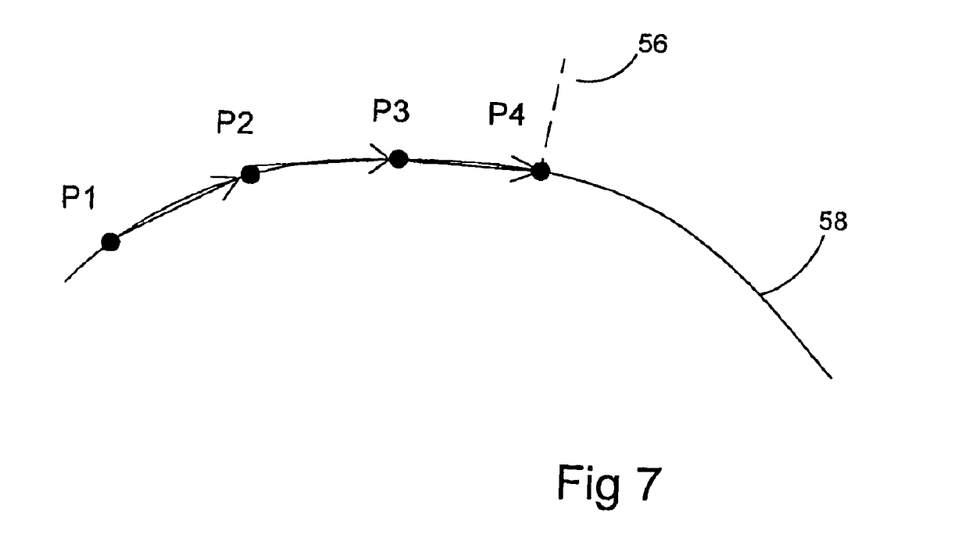
FIG. 7 illustrates historic data points used to predict a future surface point.

In this case historical data can be used to determine an appropriate deflection vector. As illustrated in FIG. 7, historical data points P1, P2 and P3 are used to predict the position of the next surface point P4 on a surface 58. From this predicted position, the surface normal 56 at point P4 may also be predicted. This method is described in U.S. Pat. No. 5,334,918 which is incorporated herein by reference.

The deflection vector is taken to lie along the predicted surface normal 56. Thus the position of the surface point is known from the measurement data and the direction of the deflection vector is estimated using historical data. The offset may be adjusted by moving one or both of the rotary axes to move the probe along the deflection vector. The drive vector may be determined by rotating the deflection vector by 90° as previously described.

However, with two or three dimensional probes there is sufficient data from the sensors to determine the deflection vector without the use of historical data.

The motorized scanning head is able to carry out a fast scan because it has a high natural frequency and can thus position the probe tip at high speed.

The motorized scanning head also has a high servo bandwidth. This means that it is able to move the probe over a large range of distances, thus it is effective in adjusting the deflection of the stylus. Furthermore, the movement of the motorized scanning head is controlled by direct drive motors which ensures a fast response to the commands from the CPU, thus enabling real time feedback to be possible.

The apparatus may be used with a range of different probes, for example having different stylus lengths. The target deflection for each probe may be programmed into the controller. Therefore the probes may be substituted for one another, with the motorized scanning head being able to continue to use feedback to adjust the stylus deflection within the limits of the particular probe. The probes may be calibrated so that they all have the same target deflection and range. Non contact probes may be likewise calibrated so that the offset target and ranges are all the same and correspond to the target deflection and range of contact probes.

The motorized scanning head may be compensated for errors in its head geometry in real time. Such errors may be created during assembly of the motorized scanning head. The scanning head is calibrated using known methods to understand its parameters. Such methods may comprise measuring a part of known dimensions, such as a datum ball, with the scanning head and thereby collecting the measurement errors which are used to calibrate the head. As the motorized scanning head is calibrated, these errors are taken into account when driving the motors of the head to adjust the position of the surface sensing device in response to the feedback.

The CMM is error mapped for rotary errors about its linear drive (e.g. pitch, roll and yaw). The scanning head is also error mapped for rotary errors. Measurement data is error corrected in real time for the combined CMM and scanning head rotary errors, thus providing synchronized error correction. It is also possible to use the same CMM and scanning head error mapping data to error correct the demand signals to both the CMM and scanning head in real time for synchronized error correction.

This method of high speed scanning is suitable for measuring unknown parts. The path the CMM is to follow may be programmed into the controller or controlled manually via a joystick. The scanning movement of the motorized scanning head, such as a sweep profile, is also programmed. During the scan, at least one rotary axis of the motorized scanning head is driven to control deflection as previously described. The drive vector controlling the CMM and at least one axis of the motorized scanning head may also be adjusted as previously described.

The angular position transducers T1 and T2 in the motorized scanning head may comprise rotary encoders. Off the shelf rotary encoders are not sufficiently accurate for the measurement requirements of the motorized scanning head and so need to be error mapped.

The scanning head contains many sources of errors, for example geometric errors and distortion caused by gravity or acceleration. It is advantageous to create an error map for the encoders which is separate from other errors, such as geometric errors.

The rotary encoders may be error mapped either before or after installation in the motorized scanning head. Error mapping the rotary encoders after installation has the advantage that errors caused by mounting the encoders, such as distortions and eccentricities are accommodated.

The encoders in the scanning head may be error mapped by driving the scanning head against a reference standard.

Figure 8:
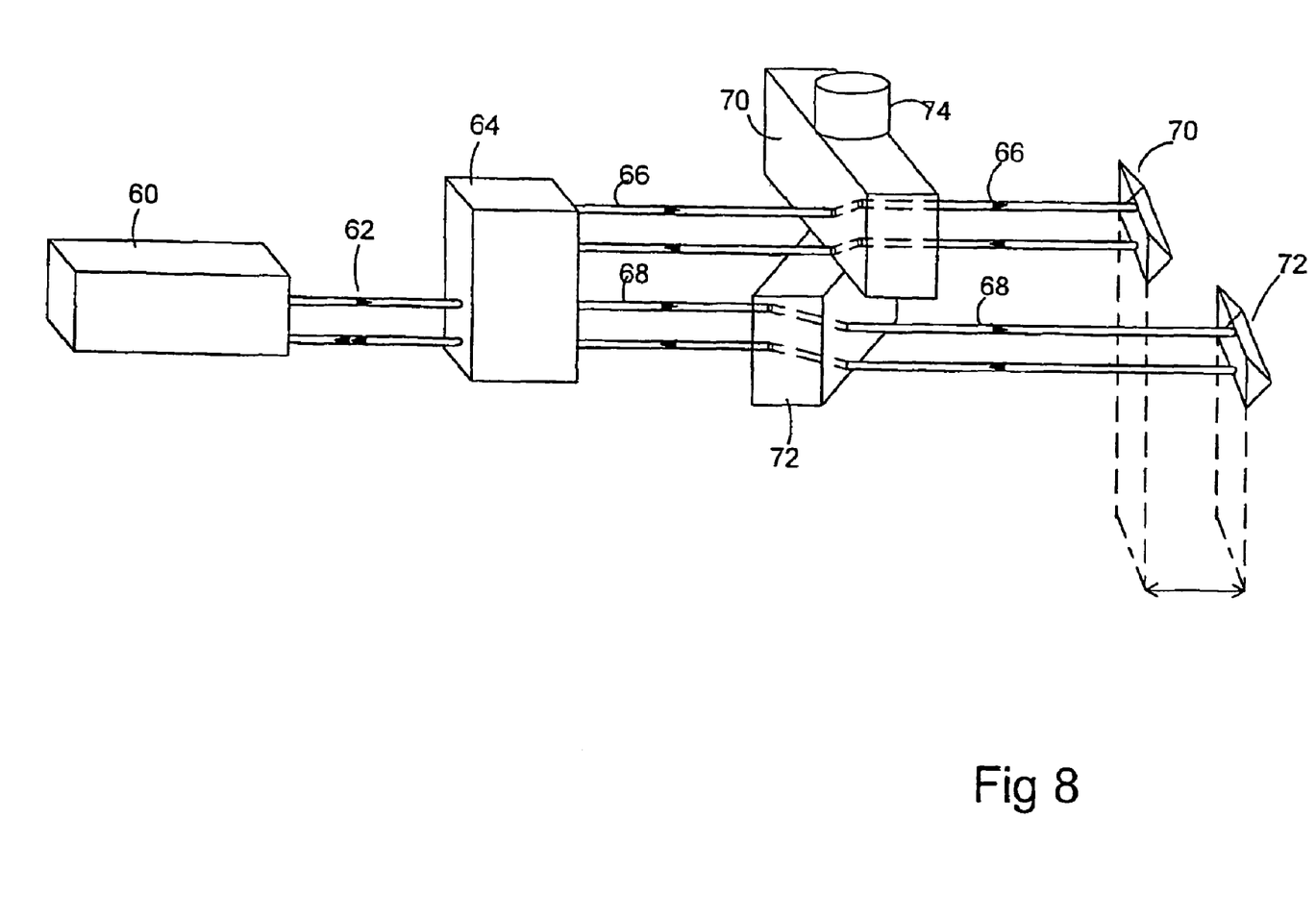
FIG. 8 illustrates angular interferometry apparatus.

A first method of error mapping the encoders is described below with reference to FIG. 8, using an angular interferometer. A suitable angular interferometer is disclosed in International Patent Application WO 96/31752. The angular interferometer includes a laser 60 which generates a beam of coherent light. A polarizing beam splitter and prism 64 split the beam into a pair of orthogonally polarized, parallel extending beams 66,68. The beams each pass through a glass block 70,72, respectively of a refractive artifact mounted onto a mount 74 of the scanning head. The beams 66,68 are subsequently reflected back parallel to their incident path by a pair of retroreflectors 70,72, displaced one relative to the other in the direction of beam propagation by a distance equal to the separation between the beams to reduce phase noise. The beams are recombined to generate an interference beam. Rotation of the scanning head results in change in relative path lengths of the beams 66 and 68 and therefore a shift in the phase of the interference beam, which may be used to determine angular displacement of the scanning head. The beams 66,68 are axially spaced, enabling the use of an artifact having a relative low moment of inertia and allowing a high range of angular displacement.

The refractive artifact is mounted on the motorized scanning head, which is rotated about each axis individually whilst measurements are taken with the scanning head encoders and the interferometer apparatus. The two sets of measurement are used to create an error function or look up table.

As the interferometer can only take reading over a finite angle, a slipping clutch arrangement is used so that the encoders can be error mapped over the whole range. The sets of measurement data from each angular section are stitched together to create measurement data over the whole range.

The error in the scanning head angle is taken from the difference between the recorded scanning head angle and the angular position measured by the interferometer.

Figure 9:
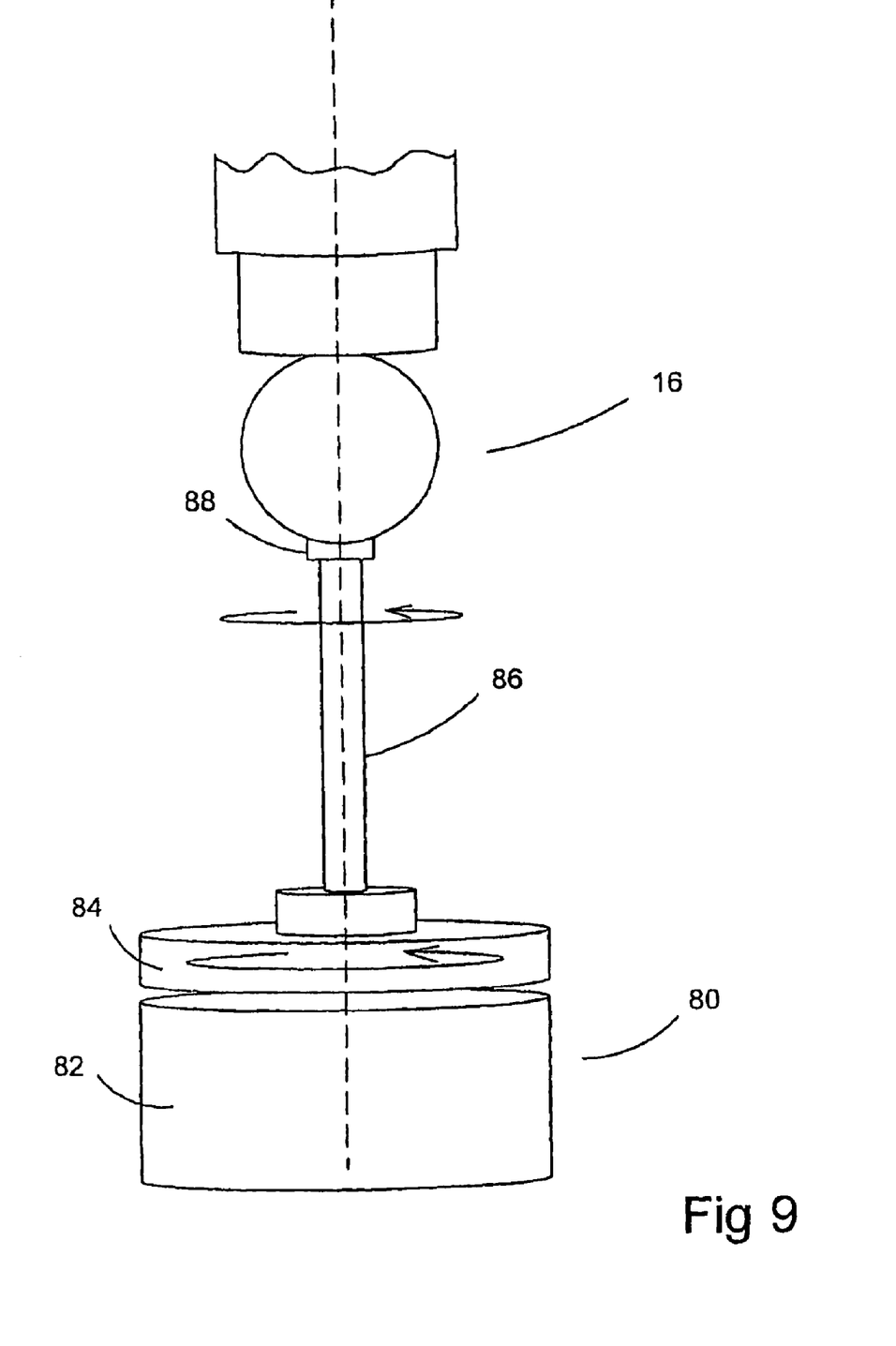
FIG. 9 is a side view of the scanning head coupled to a rotary table in a first orientation.

A second method of error mapping the encoders will now be described with reference to FIG. 9. FIG. 9 illustrates the motorized scanning head 16 directly coupled to a calibrated rotary stage, with the direct coupling aligned with the A1 axis. The rotary stage has a fixed structure 82 which is mounted onto a base and a rotatable structure 84 mounted on bearings to be rotatable relative to the fixed housing 82 about an axis. Rotary encoders are used to measure rotation of the rotatable structure relative to the fixed structure. The coupling comprises a shaft 86 which is mounted on the probe mount 88 of the scanning head 16. The shaft 86 is torsionally stiff in rotation about its longitudinal axis but allows translation in X and Y and a small amount of tilt about all axes, apart from about its longitudinal axis.

The scanning head is then rotated about the A1 axis, whilst the encoder readings in the scanning head are recorded simultaneously with the encoder readings in the rotary stage. The position reading from the scanning head encoders and calibrated rotary stage position readings may then be compared.

Figure 10:
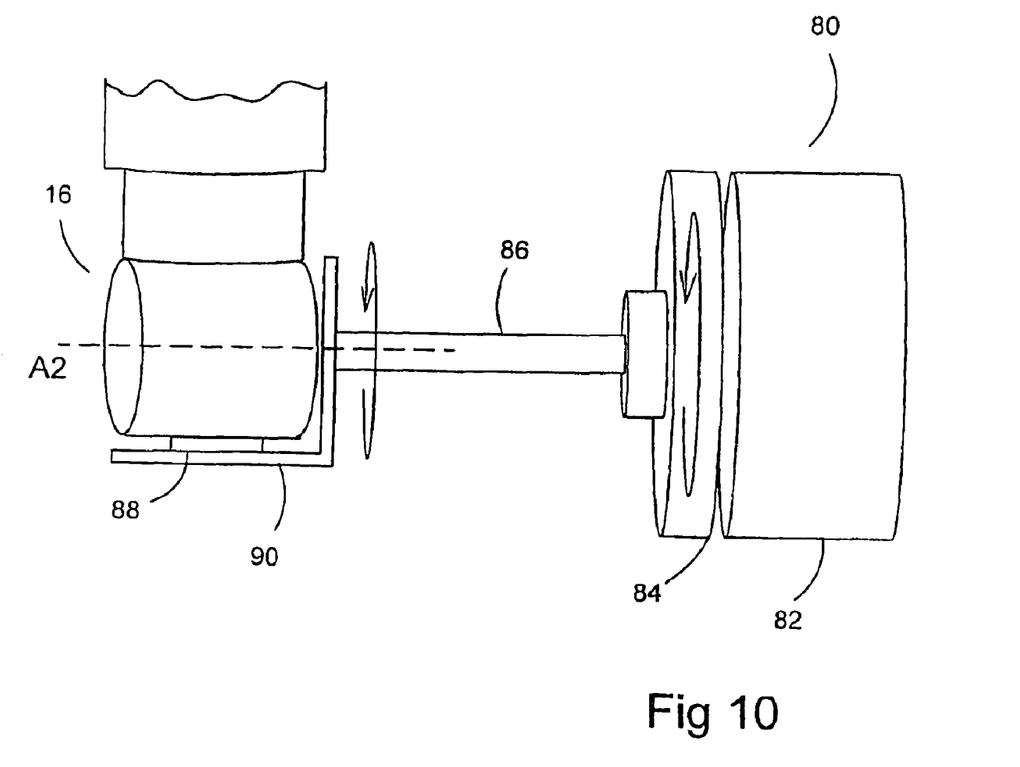
FIG. 10 is a side view of the scanning head coupled to a rotary table in a second orientation.

The encoders of the A2 axis are error mapped, as illustrated in FIG. 10. The rotary table of FIG. 10 is mounted on its side, so that the shaft 86 extends horizontally from the rotary table 80. An L-shaped plate 90 is provided at the free end of the shaft and the horizontal portion of the L-shaped plate 90 is mounted onto the probe mount 88 of the probe head. The shaft 86 is thus aligned with the A2 axis. Therefore rotation of the probe head 16 about its A2 axis causes rotation of the rotary part 84 of the rotary table 80. The scanning head is rotated about its A2 axis whilst the encoder readings from both the scanning head and the rotary table are recorded simultaneously.

The error in the scanning head reading is determined from the difference between the scanning head encoder reading and the rotary table encoder reading.

The encoders in the rotary table may be calibrated by the following method. The scanning head 16 is coupled to the rotary table 80 as illustrated in FIG. 9 with the shaft 86 rigidly coupling the scanning head and rotary table together.

After rotating the scanning head and coupled rotary table a predefined amount (for example one rotation), the scanning head is rotated about its A1 axis relative to the rotary table and the process repeated at this new alignment. By repeating the process at several rotational alignments about the A1 axis, the measurement results may be mathematically manipulated so that the errors from only one encoder (in this case the rotary encoder in the rotary table) are derived.

For the step of calibrating the encoders in the rotary table, the scanning head may be replaced by another device including a rotary encoder, for example a second rotary table.

In an alternative method of calibrating the encoders in the rotary table, a second rotary encoder is coupled directly to the rotary table. As before, the rotary table and second rotary encoder are rotated together whilst recording the readings from both rotary encoders. After rotating a predefined amount (for example, one rotation) the second rotary encoder is uncoupled and rotated about its axis to a new angular alignment. If incremental rather than absolute encoders are used, the rotated rotary encoders must either continue to record their positions as they are re-oriented, or must have reference markers so that their time positions can be established after reorientation. The process is repeated at several rotational alignments of the second rotary encoder about its axis. As before, this enables the errors from only one encoder to be derived, thus enabling the rotary encoder in the rotary table to be error mapped. This method has the advantage that as the second rotary table is mounted on the same bearings as the encoder in the rotary table, errors from the misalignment of bearings are eliminated.

Figure 11:
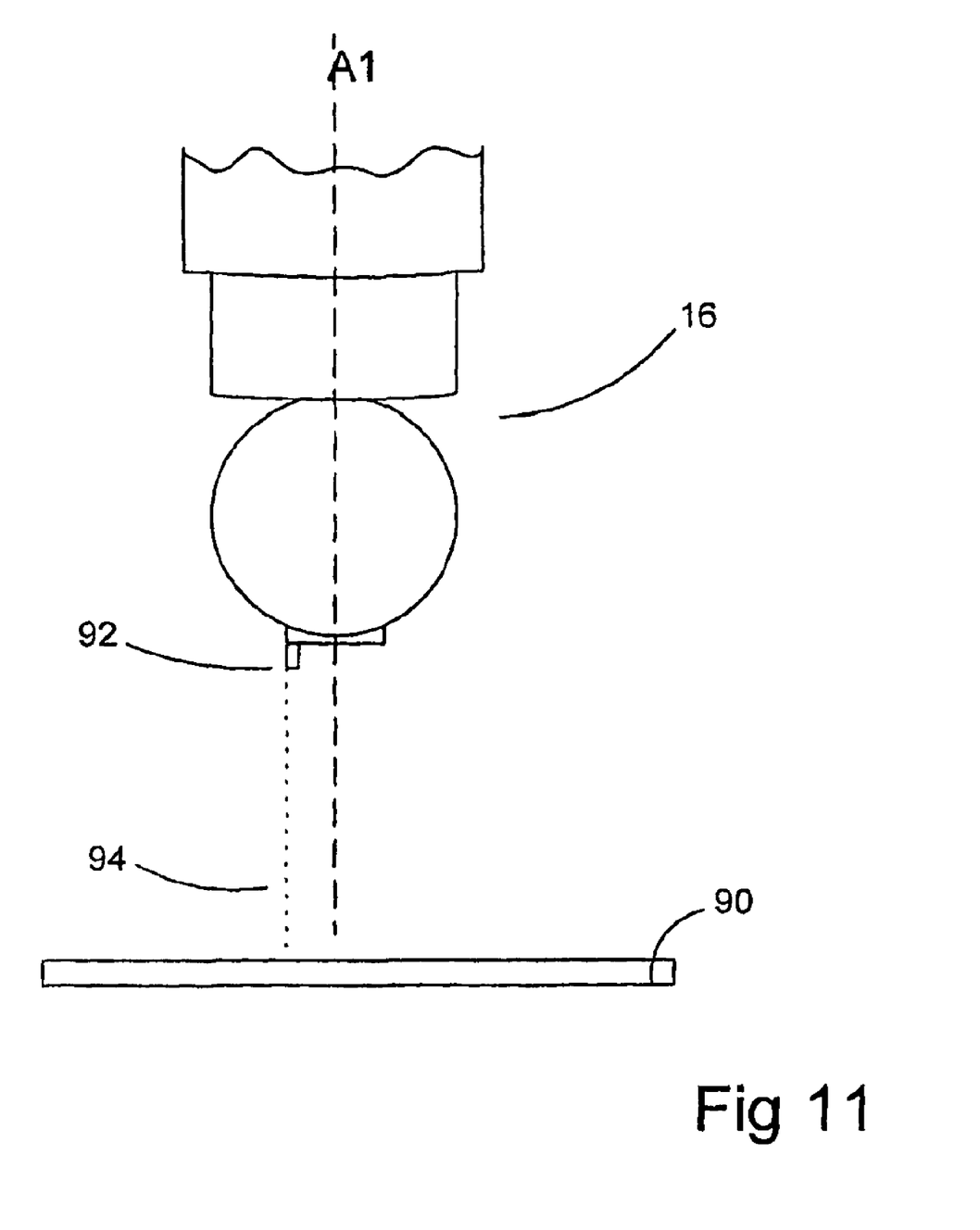
FIG. 11 illustrates non-contact apparatus for error mapping the encoders in the scanning head.

FIG. 11 illustrates a variation on the method illustrated in FIG. 9. In this embodiment, the scanning head 16 is mounted directly above a detector 90, such as a CCD or psd. A light source 92 is mounted on the motorized scanning head 16 which produces a light beam 94 incident on the detector 90. As the scanning head is rotated about its axis A1, the position of the beam 94 incident on the detector 90 will change. Thus the encoder reading can be compared with the position of the light beam on the detector.

The error in the scanning head angle is taken from the difference between the recorded scanning head angle and the recorded position of the light beam on the detector.

A look up table may be created to relate the reported scanning head angle and the error correction. Alternatively, a look up table may be created to relate the reported scanning head angle and the corrected scanning head angle.

The error corrections for scanning head angles which lie between increments in the look up table may be interpolated, for example by linear or smooth interpolation.

A polynomial function may be defined to relate either the reported scanning head angle to error or the reported scanning head angle to correct angle. This polynomial function may relate to the whole range of angles. Alternatively, several polynomial functions may be defined, each relating to a ranges of angles.

Alternatively, the error function may be modeled as a Fourier series, with the coefficients of the Fourier series stored.

Figure 12:
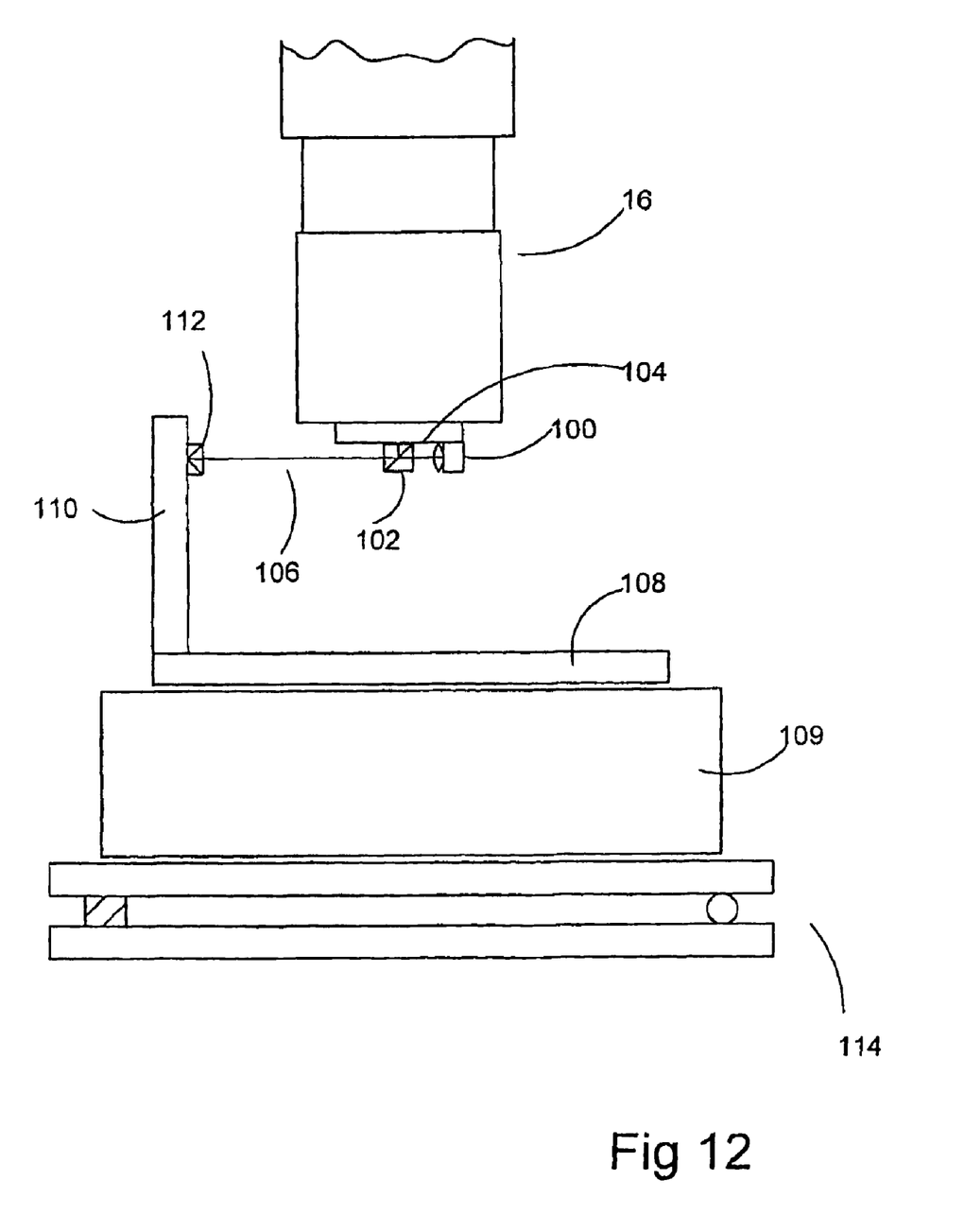
FIG. 12 illustrates a second non-contact apparatus for error mapping the encoder in the scanning head.

Another embodiment for mapping the encoders in the scanning head is illustrated in FIG. 12. In this apparatus, a collimated light source 100, beam splitter 102 and optical detector 104, such as an x,y position sensing detector (psd) are mounted onto the scanning head 16. The scanning head 16 is positioned above a rotary stage 106 which has a rotatable plate 108 rotatably mounted by bearings on a fixed structure 109. Rotary encoders are provided to measure the angular position of the rotary plate 108. The rotary plate 108 is provided with an upright post 110 on which is mounted a retroreflector 112.

When the optics on the scanning head 16 are aligned with the retroreflector 112, a light beam projected from the light source 100 will pass through the beam splitter 102 to the retroreflector 112. The retroreflector 112 reflects the beam back to the beam splitter which reflects it onto the detector 104.

The rotatable plate 108 of the rotary stage is rotated at a constant speed. The scanning head 16 is rotated about its A1 axis at a speed which matches the rotating plate, by keeping the beam incident on the detector 104. Feedback from the detector 104 is used by the controller to control the speed of the scanning head. Once the rotating plate 108 and scanning head 16 are rotating at the same speed, the outputs of the two sets of encoders are simultaneously recorded, thus enabling the scanning head encoders to be error mapped.

As the scanning head 16 rotates, one of the channels of the x,y psd reports the difference in orientation between the rotary stage and reference encoder. The other channel of the psd reports any change in the height of the retro-reflector with respect to the head and can therefore report angular misalignments between the scanning head axis and the reference axis. These can be removed by adjusting the pitch and roll of the rotary stage 106. The rotary stage 106 is mounted on a pitch and roll tilt stage 114, to enable this adjustment.

The only other possible misalignment is if the centre of rotation of the scanning head is not over the centre of rotation of the rotary stage. This can be seen as a sinusoidal difference between the scanning head and rotary stage encoder outputs which occurs once per revolution. The x,y position of the head or stage can be altered to minimize this first order error. The axes of rotation of the scanning head and rotary stage will then be coincident.

The remaining differences between the head encoder and the rotary stage encoder are then the ones of interest and can be used to error map the active head encoders as previously described.

If the rotary stage encoder is not calibrated, multiple relative angles between the scanning head and rotatable plate can be produced by moving the retro-reflector post to a number of different angles on the rotatable plate and repeating the data collection, in the same manner as described when using the coupling shaft, enabling one encoder to be error mapped.

The A2 axis of the scanning head can be mapped in the same way, with a similar arrangement to that illustrated in FIG. 10 in which the rotary table is mounted on its side and the optics are mounted on an L-shaped bracket.

The invention claimed is:

1. A measuring system for measuring a surface, the system comprising:
   a coordinate positioning apparatus;
   a probe head mounted on the coordinate positioning apparatus; and
   a surface sensing device, including a portion mounted to the probe head, the surface sensing device measuring the position of the portion relative to the surface, the probe head including at least one drive for rotating the surface sensing device about at least one axis, wherein
   the coordinate positioning apparatus is configured to move the probe head relative to the surface,
   the probe head is configured to be driven to rotate the surface sensing device about the at least one axis in order to control the position of said portion of the surface sensing device relative to the surface to within a predetermined range in real time while scanning along the surface,
   the surface sensing device is configured to be scanned along the surface by driving it with at least the probe head in at least one rotational axis along a drive vector, and
   the drive vector is in a direction in which the surface sensing device is driven along the surface, the drive vector being generally tangent to the surface at an instantaneous position of said portion of the surface sensing device, and the drive vector being controlled by at least one drive that drives only the probe head, the at least one drive adjusting the drive vector based on real-time feedback from the surface sensing device.

2. A measuring system according to claim 1 wherein the surface sensing device comprises a contact probe with a stylus which is deflectable relative to said portion, and wherein the deflection of the stylus is kept within a predetermined range.

3. A measuring system according to claim 1 wherein the surface sensing device comprises a non contact probe, and wherein the offset of the non contact probe is kept with a predetermined range.

4. A measuring system according to claim 1 wherein the relative position of the surface sensing device from the surface is kept in the predetermined range by moving the surface sensing device parallel to a deflection or offset vector.

5. A measuring system according to claim 4 wherein the surface sensing device is at least a two dimensional probe and wherein the deflection or offset vector is established from the output of the surface sensing device.

6. A measuring system according to claim 4 wherein the surface sensing device is a scalar probe, and wherein the deflection or offset vector is parallel to the surface normal.

7. A measuring system according to claim 6 wherein the surface normal is predicted using historical data.

8. A measuring system according to claim 6 wherein the surface normal is predicted from CAD data.

9. A measuring system according to claim 4, wherein the deflection or offset vector is established from the output of the surface sensing device, and the drive vector is determined from the deflection or offset vector.

10. A measuring system according to claim 9 wherein the drive vector is determined by rotating the deflection or offset vector by approximately 90°.

11. A measuring system according to claim 1 wherein feedback from the surface sensing device is used to drive the probe head to adjust the deflection or offset of the surface sensing device in real time.

12. A measuring system according to claim 1 wherein the measuring system comprises a processor which generates synchronised drive commands to the probe head and coordinate positioning machine.

13. A measuring system for measuring a surface, the system comprising:
- a coordinate positioning apparatus;
- a probe head mounted on the coordinate positioning apparatus; and
- a surface sensing device, including a portion mounted to the probe head, the surface sensing device measuring the position of the portion relative to the surface, the probe head including at least one drive for rotating the surface sensing device about at least one axis, wherein
  - the coordinate positioning apparatus is configured to move the probe head relative to the surface,
  - the probe head is configured to be driven to rotate the surface sensing device about the at least one axis in order to control a deflection or offset vector of the surface sensing device along a vector relative to the surface to within a predetermined range in real time while scanning along the surface,
  - the surface sensing device is configured to be scanned along the surface by driving it with at least the probe head in at least one rotational axis along a drive vector, and
  - the drive vector is in a direction in which the surface sensing device is driven along the surface, the drive vector being generally tangent to the surface at an instantaneous position of said portion of the surface sensing device, and the drive vector being controlled by at least one drive that drives only the probe head, the at least one drive adjusting the drive vector based on real-time feedback which is determined from the deflection or offset vector.

14. A measuring system according to claim 13 wherein the surface sensing device comprises a contact probe with a stylus which is deflectable relative to said portion, and wherein the deflection of the stylus is kept within a predetermined range.

15. A measuring system according to claim 13 wherein the surface sensing device comprises a non contact probe, and wherein the offset of the non contact probe is kept with a predetermined range.

16. A measuring system according to claim 13 wherein the surface sensing device is at least a two dimensional probe and wherein the deflection or offset vector is established from the output of the surface sensing device.

17. A measuring system according to claim 13 wherein the surface sensing device is a scalar probe, and wherein the deflection or offset vector is parallel to the surface normal.

18. A measuring system according to claim 17 wherein the surface normal is predicted using historical data.

19. A measuring system according to claim 17 wherein the surface normal is predicted from CAD data.

20. A measuring system according to claim 13 wherein the deflection or offset vector is derived from the surface normal and the drive vector is determined by rotating the surface normal.

21. A measuring system according to claim 13 wherein the drive vector is determined by rotating the deflection or offset vector by approximately 90°.

22. measuring system according to claim 13 wherein feedback from the surface sensing device is used to drive the probe head to adjust the deflection or offset of the surface sensing device in real time.

23. A measuring system according to claim 13 wherein the drive vector is adjusted in real time using the feedback from the surface sensing device.

24. A measuring system according to claim 13 wherein the measuring system comprises a processor which generates synchronised drive commands to the probe head and coordinate positioning machine.

* * * * *